(12) United States Patent
Everest et al.

(10) Patent No.: US 7,714,839 B2
(45) Date of Patent: May 11, 2010

(54) JOG DIAL FOR MOBILE TERMINAL

(75) Inventors: Paul Everest, Cary, NC (US); John Kevin Schoolcraft, Sanford, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 770 days.

(21) Appl. No.: 11/537,264

(22) Filed: Sep. 29, 2006

(65) Prior Publication Data

US 2008/0079700 A1 Apr. 3, 2008

(51) Int. Cl.
G09G 5/08 (2006.01)

(52) U.S. Cl. ............... 345/156; 345/157; 345/158; 345/159; 345/166; 345/163; 345/160; 345/161; 345/165; 345/184; 345/162

(58) Field of Classification Search ............ 345/156, 345/157, 159, 169, 173, 166, 160, 163; 710/1–74; D14/371, 378, 381, 389, 217, 240, 244, 246, D14/138 R, 140
See application file for complete search history.

(56) References Cited

U.S. PATENT DOCUMENTS

| | | | |
|---|---|---|---|
| 5,377,173 A | 12/1994 | Kim | |
| 5,432,530 A * | 7/1995 | Arita et al. ............... | 345/159 |
| 5,501,408 A | 3/1996 | Kang et al. | |
| 5,638,346 A | 6/1997 | Aramaki | |
| 5,678,451 A | 10/1997 | Vergneau et al. | |
| 5,903,229 A | 5/1999 | Kishi | |
| 5,939,684 A | 8/1999 | Sin | |
| 6,292,453 B1 | 9/2001 | Ichimura et al. | |
| 6,326,948 B1 * | 12/2001 | Kobachi et al. ............ | 345/157 |
| 6,483,500 B1 | 11/2002 | Choi et al. | |
| 6,842,169 B2 | 1/2005 | Griffin et al. | |
| 7,466,307 B2 * | 12/2008 | Trent et al. .................. | 345/173 |
| 2003/0048262 A1 * | 3/2003 | Wu et al. ..................... | 345/173 |
| 2003/0071784 A1 * | 4/2003 | Sato et al. .................... | 345/156 |
| 2004/0046732 A1 * | 3/2004 | Chesters ...................... | 345/156 |
| 2005/0190146 A1 * | 9/2005 | Chyc et al. ................... | 345/156 |

OTHER PUBLICATIONS

Sony Ericsson Mobile Communications AB et al., International Patent Application No. PCT/US2007/066821, International Preliminary Report on Patentability with Written Opinion, dated Apr. 9, 2009.

* cited by examiner

*Primary Examiner*—Richard Hjerpe
*Assistant Examiner*—Olga Merkoulova
(74) *Attorney, Agent, or Firm*—R. Brian Drozd; Moore & Van Allen, PLLC

(57) ABSTRACT

A mobile terminal is provided for use in a wireless communication system. The mobile terminal comprising a housing having an opening and a selective input device. The selective input device includes a hub secured in the opening in the housing such that at least a portion of the periphery of the hub extends from the housing. A capacitance layer is integral with the periphery of the hub. A resilient ring is movably disposed on the periphery of the hub and operatively connected with the capacitance layer for generating signals when the ring is moved relative to the hub. A controller is operably connected to the input device for receiving and processing the signals.

20 Claims, 2 Drawing Sheets

JOG DIAL FOR MOBILE TERMINAL

BACKGROUND

This invention relates generally to a mobile communication device, and more particularly to a mobile terminal for use in a wireless communication system wherein the mobile terminal includes a jog dial emulation input device.

A mobile terminal is used for sending and receiving information in a wireless communication system, such as a mobile telephone in a cellular telephone system. A mobile telephone typically includes a display and input mechanisms, such as keypads, buttons, and the like, which are used to control the mobile telephone. The display is used for viewing information and the input mechanisms typically provide for data entry, as well as control of any multi-media interface including the display.

With the growing popularity of the internet, mobile telephones are being used as receivers for not only voice data, but also various forms of visual data viewable on the display, such as e-mail, faxes or other forms of processed documents, pictures, videos or web pages. Mobile telephones can also function as a gaming device. Further, some mobile telephones now also include a camera function for capturing images and satisfying the rising demand for video or image-based communication. Capturing images is typically accomplished by manually actuating the camera function via a shutter button or a specified sequence of key strokes.

As the various functions of a mobile telephone increase, so does the need for varying types of input mechanisms for each function. At the same time, finding ways to achieve additional space savings for mobile telephones is desirable to vendors and consumers alike. As mobile telephones become smaller, less area is available for the input mechanisms. For ergonomic reasons, there is a limit below which it is undesirable to decrease the size.

A menu list, including a number of icons or other articles, are typically arranged horizontally or vertically on the display screen. A user of the mobile terminal selects an article, such as a command or a choice, by moving a selection cursor via a jog dial horizontally or vertically to the desired article. A jog dial input device typically permits rotating and pressing operations for data entry.

A mobile terminal is shown in FIG. 1 and generally designated at 20. The mobile terminal 20 depicted is adapted for use in a wireless communication network and, in the embodiment shown in FIG. 1, the mobile terminal 20 is a cellular telephone. The mobile terminal 20 comprises a housing 22, which may be of any desired size and shape; however, as described above, the trend is toward a smaller mobile terminal 20. The housing 22 contains electronic components that are operable to transmit and receive telecommunication signals, as is known in the art, and for operating other functions of the mobile terminal 20. The housing 22 includes an ear piece 24, or speaker, for emitting sound and a display 26 for displaying alphanumeric text and graphics and other images. The display 26 can be monochrome or color. A keypad apparatus 28, including alphanumeric and function keys 30, may be provided on the housing 22 for receiving tactile input to enter data, make telephone calls, interact with an image on the display 26, or otherwise control operation of the mobile terminal 20. Various other controls may also be provided on the housing 22, such as special purpose keys (not shown) that control one or more functional aspects of the mobile terminal 20. The housing 22 also includes a microphone 32 for inputting sound.

A "jog dial" 40 is rotatably disposed in the housing 22. The jog dial 40 is a well-known endless loop-type rotary switch which functions as a selective input unit. The jog dial 40 is both rotatable and pressable. To operate the jog dial 40, the user places his finger tip on the jog dial 40 and rotates the jog dial. Rotation of the jog dial 40 generates signals in accordance with the rotational direction the user is moving the jog dial 40. The jog dial 40 signals are sent to an application program, or the like, which varies a bidirectional parameter according to the direction of rotation. Rotation of the jog dial 40 in this manner provides access to an article appreciably detached from the currently displayed article. Pressing the jog dial 40 finalizes and enters the currently displayed article.

Providing a mobile terminal 20 with the jog dial input device 40 is not always practical because the jog dial 40 not only causes an additional cost, but also requires more space within the housing 22. A typical jog dial is usually about 13 to 16 mm. in diameter.

For the foregoing reasons, there is a need for a mobile terminal for use in a wireless communication system which is adapted to efficiently accommodate multiple functions while maintaining compactness and portability. The new mobile terminal should also accommodate a selective input device, such as a jog dial.

SUMMARY

According to the present invention, a mobile terminal is provided for use in a wireless communication system, the mobile terminal comprising a housing having an opening and a selective input device. The selective input device includes a hub secured in the opening in the housing such that at least a portion of the periphery of the hub extends from the housing. A capacitance layer is integral with the periphery of the hub. A resilient ring is movably disposed on the periphery of the hub and operatively connected with the capacitance layer for generating signals when the ring is moved relative to the hub. A controller is operably connected to the input device for receiving and processing the signals.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

As used herein, the term "keypad" is used to mean any type of input device including a touch sensitive area or areas, which may include predefined key positions or a gesture area.

Further, the term "keypad" is not intended to be limited to a keypad based on contacting switch technology. Rather, "keypad" as contemplated by this disclosure is intended to refer to any type of input technology that might be referred to as such, including a non-contacting type more typically referred to as a "touchpad" in which the proximity of conductive bodies is sensed.

Figure 1:
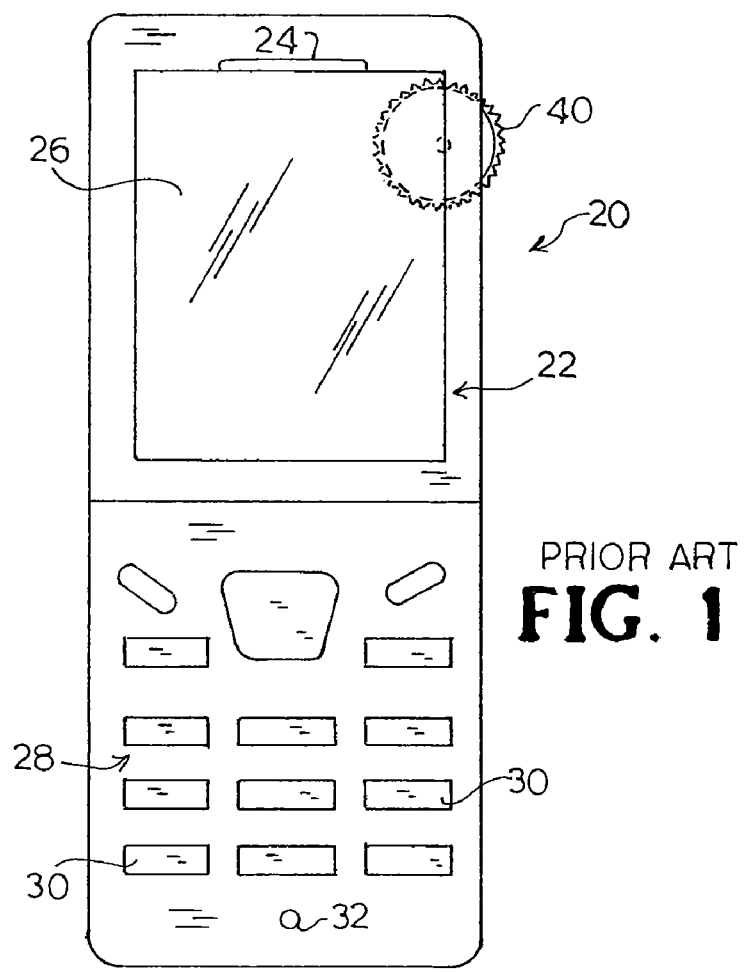
FIG. 1 is a front elevation view of an embodiment of a mobile terminal including a jog dial input device.
Figure 2:
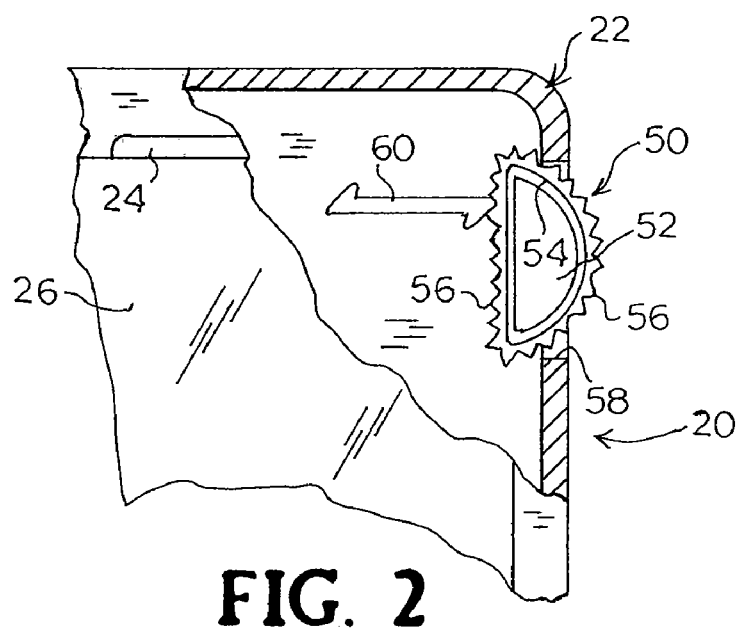
FIG. 2 is a schematic close-up elevation view of a mobile terminal in partial cross-section showing a jog dial emulation input device according to the present invention.

Referring now to the drawings, wherein like reference numerals designate corresponding or similar elements throughout the several views, a jog dial emulation input device 50 for use in a mobile terminal mobile terminal according to the present invention is shown in FIG. 2. The mobile terminal 20 depicted may be the same mobile terminal as shown in FIG. 1 and is adapted for use in a wireless communication network. In the embodiment shown in FIGS. 1 and 2, the mobile terminal 20 is a cellular telephone, which may be conventional except as otherwise provided in this description. It is understood that, because there are many types of mobile terminal housings 22 and associated components that are well known in the art and that may be utilized to practice the present invention, a more detailed description of these components is not required. It is understood that the present invention is not directed to any particular style of mobile terminal or housing.

Figure 3:
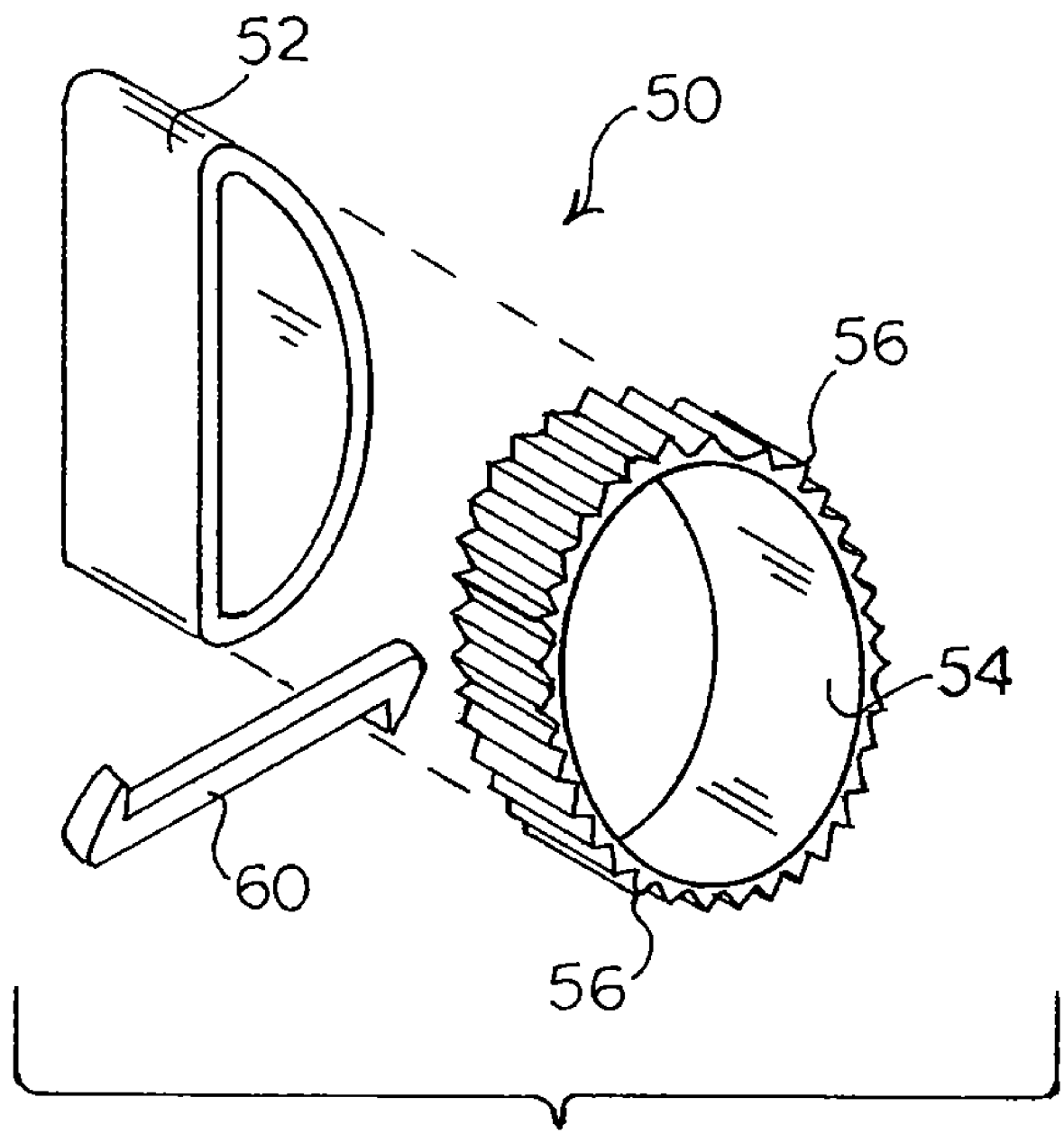
FIG. 3 is an exploded perspective view of the jog dial emulation input device shown in FIG. 2.

The jog dial emulation input device 50 according to the present invention comprises a hub 52 and a track 54. As shown in FIG. 3, the hub 52 has a D-shape, with a straight edge being from about 10 mm to about 20 mm long. A capacitance layer is provided on the periphery of the hub 52 to generate signals in response to movement of the track 54 relative to the hub 52, as will be described below.

The track 54 is a rubber ring provided with projections 56, or teeth, extending from the outer surface of the track 54. In the embodiment shown in FIG. 3, the track 54 has 33 teeth 56. It is understood, however, that the number of teeth on the track 54 may be changed without affecting the functioning of this invention. The track 54 is mounted on the periphery of the hub 52 for slidable rotation relative to the hub 52. The track 54 can be infinitely rotated.

As with a conventional jog dial, a cavity 58 is provided in the housing 22 for receiving the jog dial emulation input device 50 (FIG. 2). The cavity 58 is sufficiently large to receive the whole of the input device 50. The hub 52 is fixedly mounted in the housing 22, although the mounting assembly is not shown. In the embodiment shown in FIG. 2, the input device 50 is mounted within the cavity 58 such that the straight edge of the hub 52 is substantially parallel to the major sides of the housing 22. The arcuate periphery of the hub 52 extends slightly from housing for enabling manipulation of the track 54.

A main processor and a memory within the mobile terminal 20 control the overall operation of the mobile terminal 20 and are together referred to herein as a "controller". Electrical and programmatic functions that are necessary to enable full use of the mobile terminal 20 are implemented through the controller. The controller, along with any microcode or other software instructions, comprise means for providing input to the mobile terminal 20. Certain embodiments of the present invention may be carried out by hardwired circuitry rather than by executing software, or by a combination of hardwired circuitry with software. Hence, it will be recognized that the present invention is not limited to any specific combination of hardware circuitry and software, nor to any particular source for software instructions. The jog dial emulation input device 50 is operatively connected to the controller according to the present invention for processing signals from the input device 50 for determining rotation direction and amount, and whether the track 54 is pressed.

In one example, the jog dial emulation input device 50 is used for selecting an application program among a plurality of programs stored in the computer and for executing the application program chosen by the input device 50. In this example, the application programs are represented by images, such as articles or icons, on the display 26 of the mobile terminal 20. The input device 50 enables image-by-image viewing when the track 54 is rotated relative to the hub 52, with the possibility of stopping on and selecting an image to execute the program.

In use, the track 54 is rotated relative to the hub 52, which generates signals to the controller. In response to the signals, the controller determines the direction of rotation, clockwise or counterclockwise, of the track 54 and the amount of the rotation. If the track 54 is rotated in the counter-clockwise direction, the program menu selections are moved successively in one direction, as indicated by a selection indicator displayed on the display unit 26 as the track 54 is rotated. On the other hand, if the track 54 is rotated in the clockwise direction, the program menu selections are moved successively in the other opposite direction. In this manner, scrolling of the menu items can be effected by rotating the track 54 proportionate to the amount of rotation. The user, while viewing what is currently displayed on the display 26, advances the track 54 a suitable number of turns in the appropriate direction until the desired article is reached.

When the desired article is displayed through track 54 rotation, selection of the article can be effected by pressing the track 54 against the hub 52. When the user applies a predetermined force to the track 54, the controller considers the manipulation to be an enter operation or other relevant action applicable to the operation mode currently selected. Pressing the track 54 finalizes and enters the currently displayed number or character. Thereafter, when the applied force is removed, the input device 50 is restored to the original state.

In another embodiment of the present invention, the jog dial emulation input device 50 further includes means for generating resistance to rotation. The resistance generating means may comprise an arm 60 fixed at one end to the interior of the housing 22 (FIG. 2). The free end of the arm 60 is positioned adjacent the track 54 such that the projections 56 on the track 54 selectively engage the free end of the arm 60 as the track 54 is rotated. The displayed article is incremented or decremented by one every time the track 54 is rotated clockwise or counterclockwise, respectively, such that one projection 56 passes the end of the arm 60. For example, the track is rotated giving a feel corresponding to five clicks. In that case, the selected article is incremented five times, an increment of one per click.

The controller may also generate a sound through the speaker of the mobile terminal by using a sound driving circuit. In alternative embodiments, means for generating sound may include a speaker, a buzzer or the like.

The jog dial emulation input device 50 according to the present invention has many advantages, including the look, feel and sound of a jog dial-type device, while reducing the size for minimizing obstacles in designing and planning electronic products.

While the present invention is described herein in the context of a mobile terminal in the form of a mobile cellular telephone, it should be understood that the jog dial emulation input device of the present invention is not so limited and may find utility in other electronics devices and applications. For example, the term "mobile telephone" as used herein may include a cellular radiotelephone with or without a multi-line display; landline and cordless telephones; a Personal Communications System (PCS) terminal that may combine a cellular telephone with data processing, facsimile and data communications capabilities; internet/intranet access devices; organizers; a Personal Digital Assistant (PDA) that can include a radiotelephone, pager, internet/intranet access, Web browser, organizer, calendar and/or a global positioning system (GPS) receiver; wristwatch keypad devices; and a conventional laptop and/or palmtop receiver or other computer system that includes a display. Mobile telephones may also be referred to as "pervasive computing" devices. In one embodiment of the present invention, the invention may be implemented on a computer system having a memory circuit for storage of data, a display which acts to generate images, and a control circuit that is configured to control the flow of data between the memory and receiver. Further, the jog dial emulation input device may be used on a magnetic and electronic recording and reproducing apparatus, or any other apparatus wherein a jog dial is used selectively to input values, such as time-of-day settings in a clock mode or characters, alphabetic and symbolic, constituting a word in a text input mode. The jog dial emulation input device can also be mounted on a remote-control unit of an electronic apparatus and function in a similar way as described herein.

Although the present invention has been shown and described in considerable detail with respect to only a few exemplary embodiments thereof, it should be understood by those skilled in the art that I do not intend to limit the invention to the embodiments since various modifications, omissions and additions may be made to the disclosed embodiments without materially departing from the novel teachings and advantages of the invention, particularly in light of the foregoing teachings. For example, the present invention is suitable for use in a number of portable and non-portable electronics devices and applications. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A mobile terminal for use in a wireless communication system, the mobile terminal comprising:
   a housing having an opening;
   a selective input device including
      a hub secured in the opening in the housing such that at least a portion of the periphery of the hub extends from the housing, the hub comprising a surface integral with the periphery of the hub,
      a flexible ring movably disposed on the periphery of the hub and operatively connected with the surface for generating signals when the ring is moved relative to the hub, the flexible ring comprising a plurality of projections extending outwardly from an outer surface of the flexible ring; and
      an arm positioned adjacent to the flexible ring to engage the projections as the flexible ring is moved relative to the hub a display article is incremented every time a projection passes the arm; and
   a controller is operably connected to the input device for receiving and processing the signals.

2. A mobile terminal as recited in claim 1, wherein the portion of the hub extending from the housing is arcuate.

3. A mobile terminal as recited in claim 1, wherein the hub is D-shaped, and the straight side of the hub is inside the housing and generally parallel to the major sides of the housing.

4. A mobile terminal as recited in claim 1, wherein the ring is formed from rubber.

5. A mobile terminal as recited in claim 1, wherein the projections are integral with the outer surface of the ring.

6. A mobile terminal as recited in claim 1, wherein the arm comprises a flexible member, the flexible member being fixed to the interior of the housing and adapted to engage an area between two of the projections as the ring is moved relative to the hub.

7. A mobile terminal as recited in claim 1, wherein a predetermined force on the periphery of the hub generates a signal.

8. A mobile terminal as recited in claim 1, further comprising a visual display for displaying icons representing a selection, and a selection indicator on the display which is movable in response to signals generated by the movement of the ring for selecting the icons.

9. A mobile terminal as recited in claim 8, wherein the each icon represents an application program.

10. A mobile terminal as recited in claim 8, wherein a predetermined force on the periphery of the hub generates a signal for selecting one of the icons.

11. A selective input device for a mobile terminal in a wireless communication system, the mobile terminal including
   a housing for accommodating a controller adapted to be operably connected to the input device for receiving and processing the signals from the input device, the selective input device comprising:
      a hub adapted to be secured in an opening in the housing such that at least a portion of the periphery of the hub extends from the housing; the hub comprising a surface integral with the periphery of the hub;
      a flexible ring movably disposed on the periphery of the hub and operatively connected with the surface for generating signals when the ring is moved relative to the hub, the flexible ring comprising a plurality of projections extending outwardly from an outer surface of the flexible ring; and
      an arm positioned adjacent to the flexible ring to engage the projections as the flexible ring is moved relative to the hub a display article is incremented every time a projection passes the arm.

12. A selective input device as recited in claim 11, wherein the portion of the hub extending from the housing is arcuate.

13. A selective input device as recited in claim 11, wherein the hub is D-shaped.

14. A selective input device as recited in claim 11, wherein the ring is formed from rubber.

15. A selective input device as recited in claim 11, wherein the projections are integral with the outer surface of the ring.

16. A selective input device as recited in claim 11, wherein a predetermined force on the periphery of the hub generates a signal.

17. The selective input device as recited in claim 1, wherein the surface comprises a capacitance layer integral with the periphery of the hub to generate signals in response to movement of the flexible ring relative to the hub.

18. The selective input device as recited in claim 1, wherein the arm comprises a free end which selectively engages the projections of the flexible ring such that rotation of the flexible ring allows one projection of the projections to pass and snap the free end of the arm toward another projection giving a feel corresponding to a click.

19. A selective input device for a mobile terminal, the selective input device comprising:

a hub fixedly secured in an opening in a housing of the mobile terminal such that the hub is immoveable, the hub comprising an outer surface on the periphery of the hub, a flexible ring movably disposed on the outer surface of the hub, the flexible ring comprising a plurality of teeth extending outwardly from an outer surface of the flexible ring; and an arm positioned adjacent to the flexible ring to engage the teeth as the flexible ring is moved relative to the hub a display article is incremented every time a tooth passes the arm.

20. The selective input device as recited in claim 19, further comprising a capacitance layer integral with the outer surface of the hub to generate signals in response to movement of the flexible ring relative to the hub.

\* \* \* \* \*